(12) United States Patent
Lai

(10) Patent No.: US 8,729,741 B2
(45) Date of Patent: May 20, 2014

(54) AUTOMATIC BREAKER APPARATUS FOR USB POWER SUPPLY

(76) Inventor: Li-Chun Lai, New Taipei (TW)

(*) Notice: Subject to any disclaimer, the term of this patent is extended or adjusted under 35 U.S.C. 154(b) by 548 days.

(21) Appl. No.: 13/171,514

(22) Filed: Jun. 29, 2011

(65) Prior Publication Data

US 2013/0003419 A1 Jan. 3, 2013

(51) Int. Cl.
*H01H 83/00* (2006.01)

(52) U.S. Cl.
USPC .............. 307/125; 307/39; 307/44; 307/48; 363/17; 363/132; 363/98; 315/291; 315/292; 315/294

(58) Field of Classification Search
USPC ............ 307/125, 39, 44, 48; 363/17, 132, 98; 315/291, 292, 294
See application file for complete search history.

(56) References Cited

U.S. PATENT DOCUMENTS

| | | | |
|---|---|---|---|
| 2006/0193096 A1* | 8/2006 | Colombo et al. | 361/86 |
| 2008/0231211 A1* | 9/2008 | Baarman et al. | 315/294 |
| 2011/0291585 A1* | 12/2011 | Foo | 315/291 |

* cited by examiner

*Primary Examiner* — Rexford Barnie
*Assistant Examiner* — Jagdeep Dhillon
(74) *Attorney, Agent, or Firm* — Ming Chow; Sinorica, LLC

(57) ABSTRACT

An automatic breaker apparatus for the USB power supply, comprising a manual switch module, a relay, a high frequency transformer, a PWM power source master control module, a drive module, a signal filter module, an MCU master control module, a lighting instruction module and at least one USB power output end. When a user presses down the manual switch module, the relay becomes conductive, thus causing the electronic apparatus connected to the USB power source input end to be charged, and determining through the MCU master control module whether the electronic apparatus is using the electric current based on the pulsed filter signal outputted by the signal filter module thereby driving the relay to disconnect and also starting the lighting instruction module to generate light. Upon disconnection in the relay, electric power can no longer be transferred to the USB power output end so as to embody the objective of automatic power break, thereby achieving the features of environment protection, reduced energy consumption and power saving.

3 Claims, 3 Drawing Sheets

AUTOMATIC BREAKER APPARATUS FOR USB POWER SUPPLY

BACKGROUND OF THE INVENTION

1. Field of the Invention

The present invention relates to an automatic breaker apparatus for the USB power supply; in particular, it relates to an automatic breaker apparatus for the USB power supply capable of automatically stopping power supply in case an electronic apparatus connected thereto requires no power.

2. Description of Related Art

The structure of a conventional charger essentially consists of a case, a circuit board, an electric plug and a power source output unit, in which the circuit board is assembled inside the case, the electric plug is connected under the case and electrically coupled to the circuit board, while the power source output unit is combined with the case and electrically linked to the circuit board for charging.

However, in numerous modern mobile devices (e.g. cellular phones), to scale down the size thereof, it is typical to share certain connection terminals for several different purposes, most commonly seen in using the USB connection interface as a power source charging receptacle; whereas prior art charger may not be applicable to such a type of mobile devices. Accordingly, in order to deal with such a type of mobile devices, many manufacturers developed the USB charger such that, by connecting in plug the electronic apparatus to the USB charger, the USB charger converts an external power source to the USB end and outputs to the connected mobile device so as to charge the mobile electronic apparatus.

But, once the USB charger starts to charge, it consistently provides electric power even the mobile electronic apparatus is fully charged or no longer needs to be charged; that is, unless the user manually removes the mobile electronic apparatus from the USB charger, the USB charger continuously offers electric power thus resulting in unnecessary electric power consumption. Furthermore, as the number of mobile electronic apparatus increases, such an energy waste problem also undesirably exacerbates. Consequently, it is needed to develop a solution to address this issue.

Hence, it would the best solution if an automatic breaker apparatus for the USB power supply can be provided such that the power supply can be automatically stopped when an electronic apparatus connected thereto no longer requires electric power.

SUMMARY OF THE INVENTION

The objective of the present invention lies in providing an automatic breaker apparatus for the USB power supply which is capable of automatically stopping power supply in case an electronic apparatus connected thereto requires no power, thereby fulfilling the requirements of power saving as well as environment protection.

An automatic breaker apparatus for a USB power supply capable of achieving the aforementioned inventive objectives comprises: a power source input module, used to receive main supply signals; a relay, connected with the power source input module, wherein the relay is used to control whether the voltage inputted by the power source input module is applicable to supply electric power; a manual switch module, connected with the power source input module and the relay, wherein the manual switch module controls the connection of the relay; a drive module, connected with the relay, wherein the drive module is used to drive the relay to connect or to disconnect; a first rectifier module, connected with the relay, wherein the first rectifier module rectifies the voltage inputted by the power source input module into pulsed direct-current (DC) power; a first filter module, connected with the first rectifier module, wherein the first filter module regulates the rectified pulsed DC power inputted by the first rectifier module into stabilized DC power; a high frequency transformer, connected with the first filter module, wherein the high frequency transformer transforms the high voltage inputted by the first filter module into low voltage; an EMI absorption module, connected with the high frequency transformer, wherein the EMI absorption module absorbs the over-voltage on the high frequency transformer so as to reduce electromagnetic interferences; a voltage sampling module, connected with the high frequency transformer, wherein the voltage sampling module performs voltage samplings on the voltage outputted by the high frequency transformer; a PWM power source master control module, connected with the voltage sampling module and the high frequency transformer, which receives the sampling signal fed back from the voltage sampling module and controls the actions of the high frequency transformer based on the received sampling signal; a starting resistor, connected with the first filter module and the PWM power source master control module, wherein the starting resistor provides a starting voltage into the PWM power source master control module such that the PWM power source master control module starts to operate; a second rectifier module, connected with the high frequency transformer, wherein the second rectifier module rectifies the voltage outputted by the high frequency transformer into pulsed DC power; a signal filter module, connected with the second rectifier module, wherein the signal filter module filters the pulsed DC power outputted by the second rectifier module into a pulsed filter signal; an MCU master control module, connected with the drive module and the signal filter module, wherein the signal filter module inputs a pulsed filter signal identifiable by the MCU master control module and the MCU master control module determines whether the relay should be disconnected based on the pulsed filter signal, so that it is possible to determine whether a mobile device is using the electric current in order to disconnect the relay such that the entire product can be turned off thereby achieving the objectives of environment protection, reduced energy consumption and power saving; a second filter module, connected with the second rectifier module, wherein the second filter module regulates the rectified pulsed DC power inputted by the second rectifier module into stabilized DC power; a voltage divider network module, connected with the second filter module, wherein the voltage divider network module provides the identification for the electronic apparatus; and at least one USB power output module, connected with the voltage divider network module and the electronic apparatus, wherein the at least one USB power output module provides the operating power for the electronic apparatus.

In a preferred embodiment, the MCU master control module is connected with a lighting instruction module, and the MCU master control module determines whether the lighting instruction module should be started based on the pulsed filter signal outputted by the signal filter module.

In a preferred embodiment, the lighting instruction module is a Light-Emitting Diode (LED).

DETAILED DESCRIPTION OF THE PREFERRED EMBODIMENTS

The aforementioned and other technical contents, aspects and effects in relation with the present invention can be clearly appreciated through the detailed descriptions concerning the preferred embodiments of the present invention in conjunction with the appended drawings.

Figure 1:
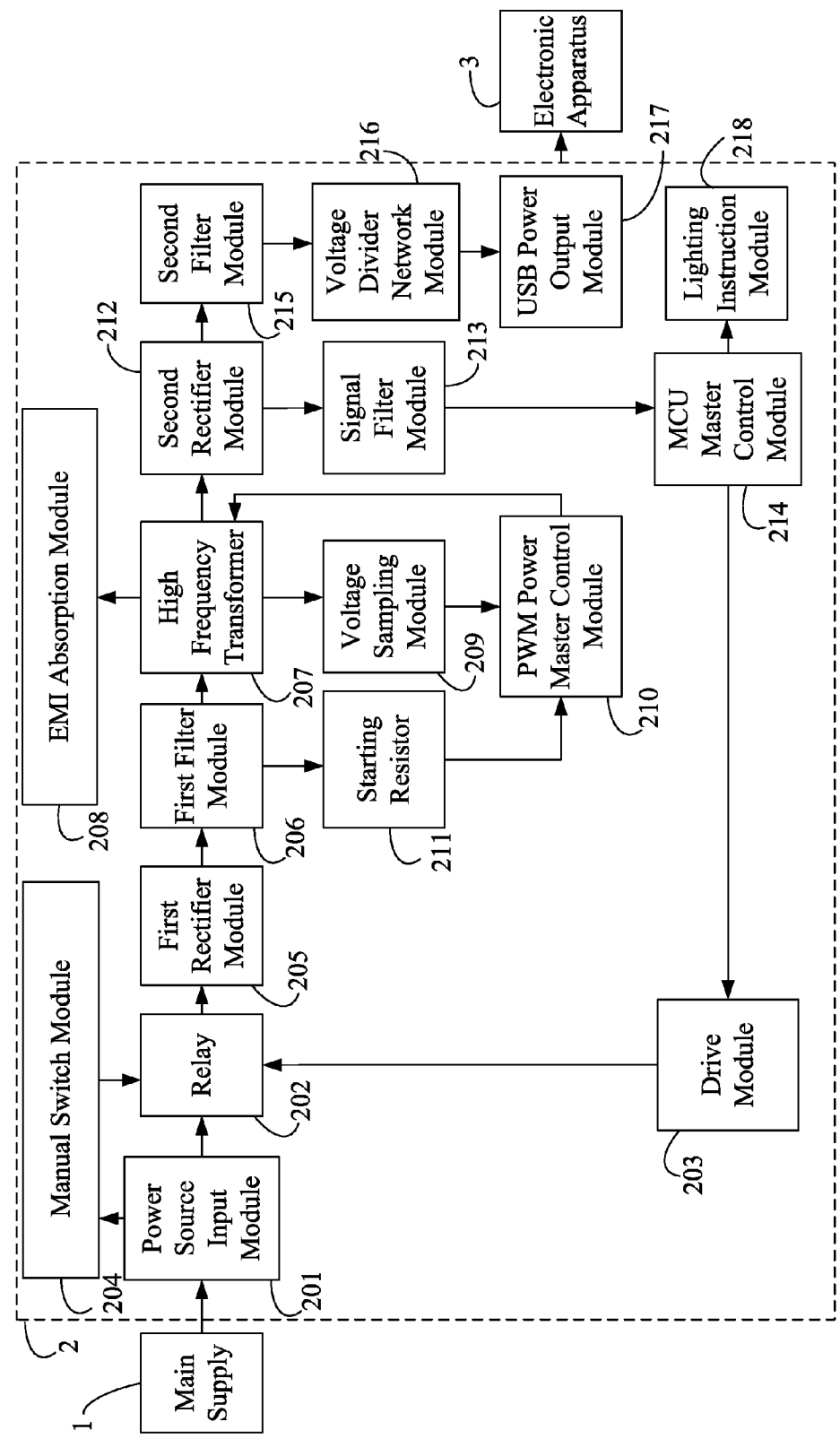
FIG. 1 shows the architecture diagram of the automatic breaker apparatus for the USB power supply according to the present invention.
Figure 2:
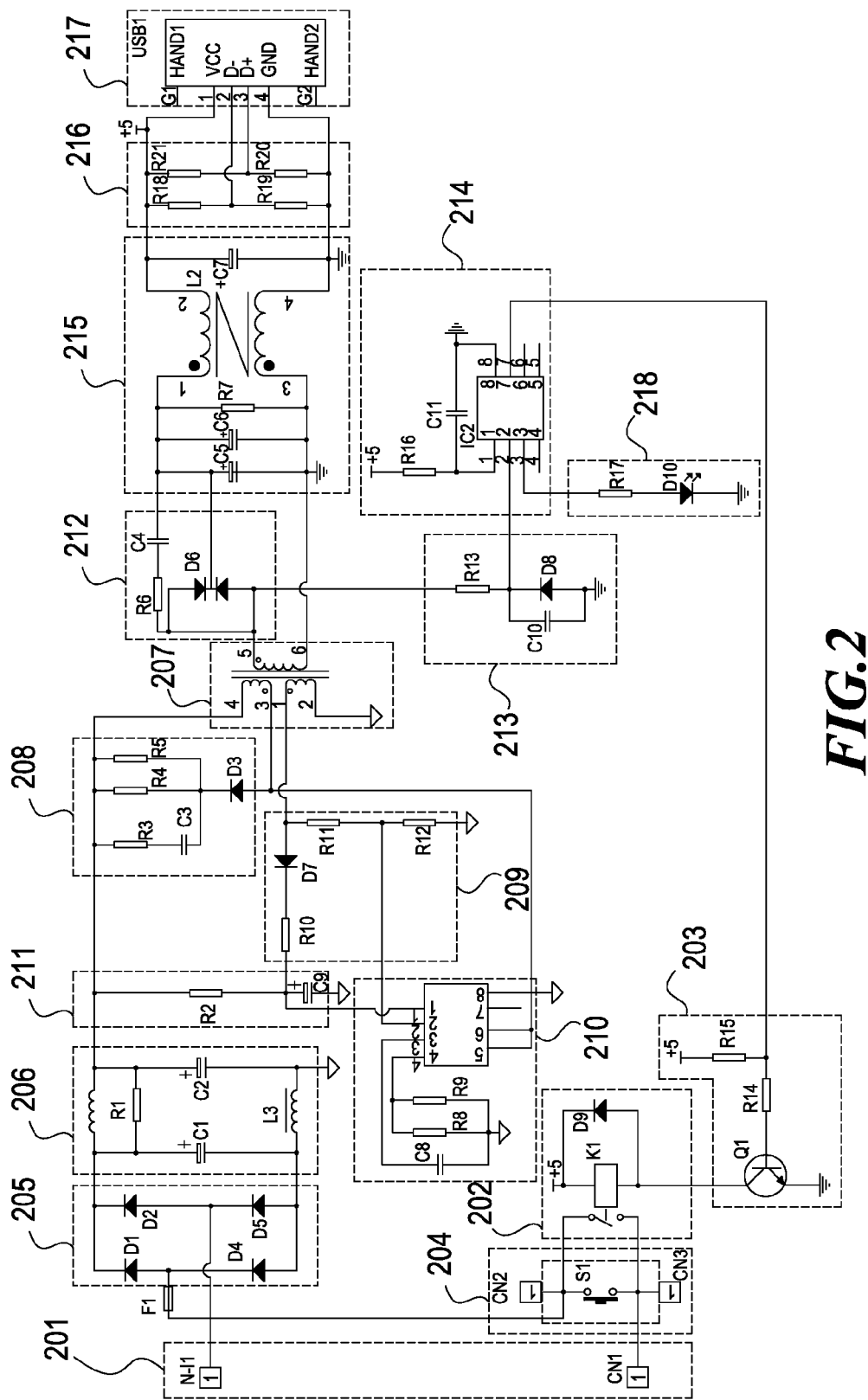
FIG. 2 shows the circuit diagram of the automatic breaker apparatus for the USB power supply according to the present invention.

Refer initially to FIGS. 1 and 2, wherein an architecture diagram and a circuit diagram of an automatic breaker apparatus for the USB power supply according to the present invention are respectively shown, essentially comprising:

a power source input module 201, connected with the main supply 1 in order to receive signals from the main supply;

a relay 202, connected with the power source input module 201, wherein the relay 202 is used to control whether the voltage inputted by the power source input module 201 is applicable to supply electric power;

a drive module 203, connected with the relay 202, wherein the drive module 203 is used to drive the relay 202 to connect or to disconnect;

a manual switch module 204, connected with the power source input module 201 and the relay 202, wherein the manual switch module 204 controls the connection of the relay 202 to provide electric power;

a first rectifier module 205, connected with the relay 202, wherein the first rectifier module 205 rectifies the voltage inputted by the power source input module 201 into pulsed direct-current (DC) power;

a first filter module 206, connected with the first rectifier module 205, wherein the first filter module 206 regulates the rectified pulsed DC power inputted by the first rectifier module 205 into stabilized DC power;

a high frequency transformer 207, connected with the first filter module 206, wherein the high frequency transformer 207 transforms the high voltage inputted by the first filter module 206 into low voltage;

an EMI absorption module 208, connected with the high frequency transformer 207, wherein the EMI absorption module 208 absorbs the over-voltage on the high frequency transformer 207 so as to reduce electromagnetic interferences;

a voltage sampling module 209, connected with the high frequency transformer 207, wherein the voltage sampling module 209 performs voltage samplings on the voltage outputted by the high frequency transformer 207;

a PWM power source master control module 210, connected with the voltage sampling module 209 and the high frequency transformer 207, which receives the sampling voltage from the voltage sampling module 209 and controls the output of low voltage by the high frequency transformer 207 based on the received voltage signal;

a starting resistor 211, connected with the first filter module 206 and the PWM power source master control module 210, wherein the starting resistor 211 provides a starting voltage into the PWM power source master control module 210 such that the PWM power source master control module 210 starts to operate;

a second rectifier module 212, connected with the high frequency transformer 207, wherein the second rectifier module 212 rectifies the voltage outputted by the high frequency transformer 207 into pulsed DC power;

a signal filter module 213, connected with the second rectifier module 212, wherein the signal filter module 213 filters the pulsed DC power outputted by the second rectifier module 212 into a pulsed filter signal;

an MCU master control module 214, connected with the drive module 203 and the signal filter module 213, wherein the signal filter module 213 inputs a pulsed filter signal identifiable by the MCU master control module 214 and the MCU master control module 214 determines whether the drive module 203 should be started to disconnect the relay 202 based on the pulsed filter signal;

a second filter module 215, connected with the second rectifier module 212, wherein the second filter module 215 regulates the rectified pulsed DC power inputted by the second rectifier module 212 into stabilized DC power;

a voltage divider network module 216, connected with the second filter module 215, wherein the voltage divider network module 216 provides the identification for the electronic apparatus 3;

at least one USB power output module 217, connected with the voltage divider network module 216 in order to receive the power source signal from the voltage divider network module 216 and allow connections to the USB plug of the electronic apparatus 3, wherein the at least one USB power output module 217 provides the operating power for the electronic apparatus 3.

As such, under normal condition, the entire apparatus is in a non-conductive state; upon pressing down the manual switch module 204 by a user, the relay 202 becomes conductive thus causing the electric power coming from the main supply 1 passes initially the relay 202, travelling next through the first rectifier module 205 and the first filter module 206, further reaching the starting resistor 211, such that the PWM power source master control module 210 begins to operate so as to control the high frequency transformer to generate a lower voltage.

After that the high frequency transformer 207 begins to output the voltage, the over-voltage thereby outputted will be absorbed by the EMI absorption module 208, and also the high frequency transformer 207 outputs a voltage which is fed back to the PWM power source master control module 210 by means of the voltage sampling module 209, thus allowing the PWM power source master control module 210 to consistently control the operation of the high frequency transformer. On the other hand, the high frequency transformer 207 may also provide the electronic apparatus 3 with the electric power output by way of the second rectifier module 212, the second filter module 215, the voltage divider network module 216 and finally the USB power output module 217.

In addition, the high frequency transformer 207 outputs a pulsed filter signal to the MCU master control module 214 via the signal filter module 213 thereby allowing the MCU master control module 214 to perform detections. Consequently, when the electronic apparatus 3 connected to the USB power output module 217 is using the electric current, the signal width detected by the MCU master control module 214 will be smaller than a predetermined value, so the MCU master control module 214 illuminates the lighting instruction module 218 and maintains conductivity of the relay 202. Alternatively, in case that the electronic apparatus 3 no longer uses the electric current, the width of the pulsed filter signal detected by the MCU master control module 214 will become greater than the predetermined value, so the MCU master control module 214 turns off the lighting instruction module 218. Meanwhile, after that the detection of the pulsed filter signal width by the MCU master control module 214 being greater than the predetermined value holds for a duration of time, the relay will be disconnected thereby cutting off the electric power to the automatic breaker apparatus 2 in the USB power supply, so as to achieve the objectives of power saving and environment protection.

It should be noted that the MCU master control module 214 can be connected with a lighting instruction module 218 and determine whether the lighting instruction module 218 should be started based on the pulsed filter signal outputted by the signal filter module 213, wherein the lighting instruction module 218 is a Light-Emitting Diode (LED). Additionally, the lighting instruction module 218 is used to illustrate through light emissions the power status of the electronic apparatus 3 connected in plug onto the USB output module 217.

It should be also appreciated that, when the electronic apparatus 3 connected to the USB output module 217 no longer needs electric power, the MCU master control module 214 may detect signal variations occurring in the output from the high frequency transformer and, after lasting for a duration of time, automatically disconnect the relay 202 in order to achieve the objectives of power saving and environment protection.

Figure 3:
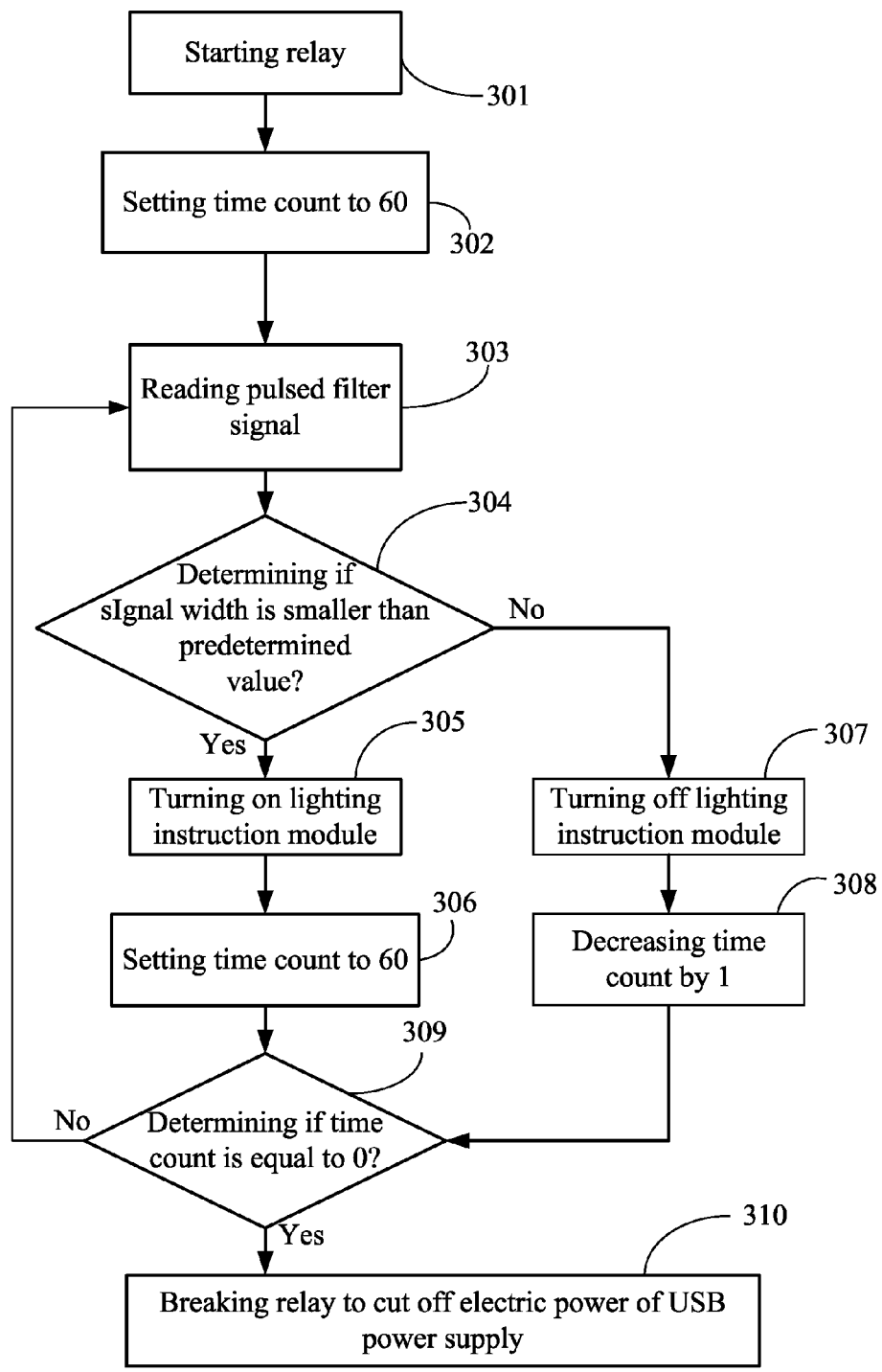
FIG. 3 shows the flowchart of automatic power break operations in the automatic breaker apparatus for the USB power supply according to the present invention.

Refer next to FIG. 3, wherein a flowchart of automatic power breakage in an automatic breaker apparatus for the USB power supply according to the present invention is shown, comprising the following steps:

1. Upon pressing down the manual switch module by a user, turning on the relay (301);

2. Setting a time count to 60 by the MCU master control module (302) and reading the pulsed filter signal inputted by the signal filter module (303);

3. Determining whether the width of the pulsed filter signal inputted by the signal filter module is smaller than a predetermined value (304); if yes, then turning on the lighting instruction module (305) and setting the time count to 60 (306); otherwise, if the width of the pulsed filter signal inputted by the signal filter module is not smaller than the predetermined value, then turning off the lighting instruction module (307) and decreasing the time count by 1 (308);

4. Determining whether the time count is equal to zero (309); if yes, then disconnecting the relay thereby stopping electric power of the automatic breaker apparatus for the USB power supply (310); if the time count is not equal to zero second, then returning to STEP 303 where the signal inputted by the signal filter module is re-acquired.

Compared with prior art, the automatic breaker apparatus for the USB power supply provided by the present invention further offers the following advantages:

1. The present invention allows to detect signal variations occurring in the output from the high frequency transformer when the electronic apparatus connected in plug to the automatic breaker apparatus for the USB power supply no longer needs electric power, and after holding for a duration of time, the relay can be automatically disconnected in order to achieve the objectives of power saving and environment protection.

By way of the aforementioned detailed descriptions for the preferred embodiments according to the present invention, it is intended to better illustrate the characters and spirit of the present invention rather than restricting the scope of the present invention to the preferred embodiments disclosed in the previous texts. Contrarily, the objective is to encompass all changes and effectively equivalent arrangements within the scope of the present invention as delineated in the following claims of the present application.

What is claimed is:

1. An automatic breaker apparatus for a USB power supply, comprising:

a power source input module, used to receive main supply signals;

a relay, connected with the power source input module, wherein the relay is used to control whether the voltage inputted by the power source input module is applicable to supply electric power;

a manual switch module, connected with the power source input module and the relay, wherein the manual switch module controls the connection of the relay;

a drive module, connected with the relay, wherein the drive module is used to drive the relay to connect or to disconnect;

a first rectifier module, connected with the relay, wherein the first rectifier module rectifies the voltage inputted by the power source input module into pulsed direct-current (DC) power;

a first filter module, connected with the first rectifier module, wherein the first filter module regulates the rectified pulsed DC power inputted by the first rectifier module into stabilized DC power;

a high frequency transformer, connected with the first filter module, wherein the high frequency transformer transforms the high voltage inputted by the first filter module into low voltage;

an EMI absorption module, connected with the high frequency transformer, wherein the EMI absorption module absorbs the over-voltage on the high frequency transformer so as to reduce electromagnetic interferences;

a voltage sampling module, connected with the high frequency transformer, wherein the voltage sampling module performs voltage samplings on the voltage outputted by the high frequency transformer;

a PWM power source master control module, connected with the voltage sampling module and the high frequency transformer, which receives the sampling signal fed back from the voltage sampling module and controls the actions of the high frequency transformer based on the received sampling signal;

a starting resistor, connected with the first filter module and the PWM power source master control module, wherein the starting resistor provides a starting voltage into the PWM power source master control module such that the PWM power source master control module starts to operate;

a second rectifier module, connected with the high frequency transformer, wherein the second rectifier module rectifies the voltage outputted by the high frequency transformer into pulsed DC power;

a signal filter module, connected with the second rectifier module, wherein the signal filter module filters the pulsed DC power outputted by the second rectifier module into a pulsed filter signal;

an MCU master control module, connected with the drive module and the signal filter module, wherein the signal filter module inputs a pulsed filter signal identifiable by the MCU master control module and the MCU master control module determines whether the drive module should be started to disconnect the relay based on the pulsed filter signal;

a second filter module, connected with the second rectifier module, wherein the second filter module regulates the rectified pulsed DC power inputted by the second rectifier module into stabilized DC power;

a voltage divider network module, connected with the second filter module, wherein the voltage divider network module provides the identification for the electronic apparatus; and at least one USB power output module, connected with the voltage divider network module and the electronic apparatus, wherein the at least one USB power output module provides the operating power for the electronic apparatus.

2. The automatic breaker apparatus for the USB power supply according claim 1, wherein the MCU master control module is connected with a lighting instruction module, and the MCU master control module determines whether the lighting instruction module should be started based on the pulsed filter signal outputted by the signal filter module.

3. The automatic breaker apparatus for the USB power supply according claim 1, wherein the lighting instruction module is a Light-Emitting Diode (LED).

* * * * *